US012747995B2

(12) United States Patent
Neumann et al.

(10) Patent No.: US 12,747,995 B2
(45) Date of Patent: Sep. 29, 2026

(54) METHOD FOR DETERMINING THE TEMPERATURE IN AN ELECTRONIC CONTROLLER OF A MOTOR VEHICLE

(71) Applicant: MELECS EWS GmbH, Siegendorf (AT)

(72) Inventors: Philipp Neumann, St. Margarethen an der Sierning (AT); Christian Gemeiner, Breitenfurt (AT)

(73) Assignee: MELECS EWS GmbH, Siegendorf (AT)

( * ) Notice: Subject to any disclaimer, the term of this patent is extended or adjusted under 35 U.S.C. 154(b) by 305 days.

(21) Appl. No.: 18/564,136

(22) PCT Filed: May 25, 2022

(86) PCT No.: PCT/EP2022/064270

§ 371 (c)(1),
(2) Date: Nov. 27, 2023

(87) PCT Pub. No.: WO2022/248584

PCT Pub. Date: Dec. 1, 2022

(65) Prior Publication Data

US 2024/0247983 A1 Jul. 25, 2024

(30) Foreign Application Priority Data

May 28, 2021 (EP) .................................... 21176531

(51) Int. Cl.

| | |
|---|---|
| ***G01K 7/18*** | (2006.01) |
| ***G01K 15/00*** | (2006.01) |
| ***H02P 29/64*** | (2016.01) |

(52) U.S. Cl.
CPC ............. *G01K 7/18* (2013.01); *G01K 15/005* (2013.01); *H02P 29/64* (2016.02); *G01K 2217/00* (2013.01)

(58) Field of Classification Search
CPC .... G01K 7/18; G01K 15/005; G01K 2217/00; H02P 29/64; H02P 29/664
USPC .............................................................. 374/1
See application file for complete search history.

(56) References Cited

U.S. PATENT DOCUMENTS

| | | | | |
|---|---|---|---|---|
| 11,579,638 | B2 * | 2/2023 | Lounnas | G05D 23/1917 |
| 2018/0238441 | A1 * | 8/2018 | Richter | F15B 19/005 |

FOREIGN PATENT DOCUMENTS

| | | | |
|---|---|---|---|
| DE | 19823685 | 12/1999 | |
| DE | 102013213462 | 1/2015 | |
| DE | 102013213462 A1 * | 1/2015 | F02D 41/20 |
| DE | 102015212135 | 7/2016 | |
| DE | 102015112920 | 2/2017 | |

(Continued)

OTHER PUBLICATIONS

PCT International Search Report dated Jun. 28, 2022 based on PCT/EP2022/064270 filed May 25, 2022.

*Primary Examiner* — Peter J Macchiarolo
*Assistant Examiner* — Mireille S Sadate-Moualeu
(74) *Attorney, Agent, or Firm* — Cozen O'Connor

(57) ABSTRACT

The invention relates to a method for determining the temperature in an electronic controller of a motor vehicle, the controller having at least one electrical winding, characterized in that the electrical resistance of the winding is determined in a defined operating state and based thereon the temperature is determined.

6 Claims, 3 Drawing Sheets

(56) References Cited

FOREIGN PATENT DOCUMENTS

| | | | |
|---|---|---|---|
| EP | 0284711 | | 10/1988 |
| EP | 2725331 | A2 | 4/2014 |

* cited by examiner

METHOD FOR DETERMINING THE TEMPERATURE IN AN ELECTRONIC CONTROLLER OF A MOTOR VEHICLE

CROSS-REFERENCE TO RELATED APPLICATIONS

This is a U.S. national stage of application No. PCT/EP2022/064270 filed 25 May 2022. Priority is claimed on European Application No. 21176531.8 filed 28 May 2021, the content of which is incorporated herein by reference in its entirety.

BACKGROUND OF THE INVENTION

1. Field of the Invention

The present invention relates to a method for determining the temperature within an electronic control device of a motor vehicle.

2. Description of the Related Art

In the automotive sector, highly developed electronic control devices are currently used in motor vehicles to monitor a variety of functions, such as controlling a transmission and/or a clutch. For this purpose, signals from a plurality of sensors are detected, processed and converted via electric motors and actuators into a linear or rectilinear movement of a motor vehicle component.

An exemplary area of application is the automatic actuation of a starting and shifting clutch of a motor vehicle, where the component to be actuated possibly is, for example, a central release of the friction clutch. In the event of actuation, such a central release acts, for example, on the diaphragm spring of the clutch such that it is disengaged or brought into a slip position in which it cannot transmit any or only a reduced torque from the drive motor of the vehicle to the transmission.

In the case of clutches or transmissions of motor vehicles, it is customary to continuously monitor the temperature to detect faults at an early stage and to avoid damage to the components as a result of excessive temperatures. Such monitoring is usually performed with the aid of temperature sensors.

The temperature sensor is usually attached to a relevant or suitable location and transmits the measured temperatures, for example, to a corresponding control device. Usually, for the temperature measurement of clutch or transmission, a temperature sensor is mounted on the transmission or the clutch. The electrical signals of the temperature sensor are then transmitted to the corresponding control device, for example, via a plug connection.

The disadvantage of a temperature sensor mounted in this way is that its installation is relatively complex and expensive, and that malfunctions may occur repeatedly due to the plug connections.

DE 198 23 685 A1 discloses a control device for an automatic motor vehicle transmission with a housing in which a base plate of the housing is connected in a planar and thermally conductive manner to a unit to be monitored. A temperature measuring unit consisting of a switch carrier and resistance tracks with temperature-dependent conductivity is attached to the base plate via a thermally conductive adhesive. The disadvantage of the temperature measurement disclosed in DE 198 23 685 A1 is, in addition to a complex installation that saves little space, particularly the planar attachment of the base plate of the housing to the unit to be monitored. As a result, not only the temperature measuring unit, but also the control device is heated, which can result in malfunctions and damage, for example, to components of the control device.

SUMMARY OF THE INVENTION

In view of the foregoing, it is therefore an object of the to provide a method for determining the temperature, via which a temperature measurement, in particular of the transmission or clutch, can be performed in a simple, space-saving and cost-effective manner with low susceptibility to faults.

This and other objects and advantages are achieved in accordance with the invention by a method in which the electrical resistance of a winding is determined in a defined operating state and based thereon the temperature is determined. With the inventive method, the error-prone and complex use of temperature sensors can be avoided.

It is advantageous if the electrical resistance of the winding is determined by applying an electrical impulse with constant current amplitude and measuring the voltage at the winding or by applying an electrical impulse with constant voltage amplitude and measuring the current in the winding.

The temperature of the winding can be determined in a simple manner from the resistance by using the temperature coefficient of the specific resistance of the material of the winding.

The accuracy of the method can be advantageously increased if, in an idle state of the electrical device in which the internal temperature of the device corresponds to the ambient temperature, the ambient temperature is determined and with this known temperature, a calibration process of temperature determination is then performed.

In an advantageous embodiment, the winding is part of an electric motor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail with reference to figures, in which.

DETAILED DESCRIPTION OF THE EXEMPLARY EMBODIMENTS

Figure 1:
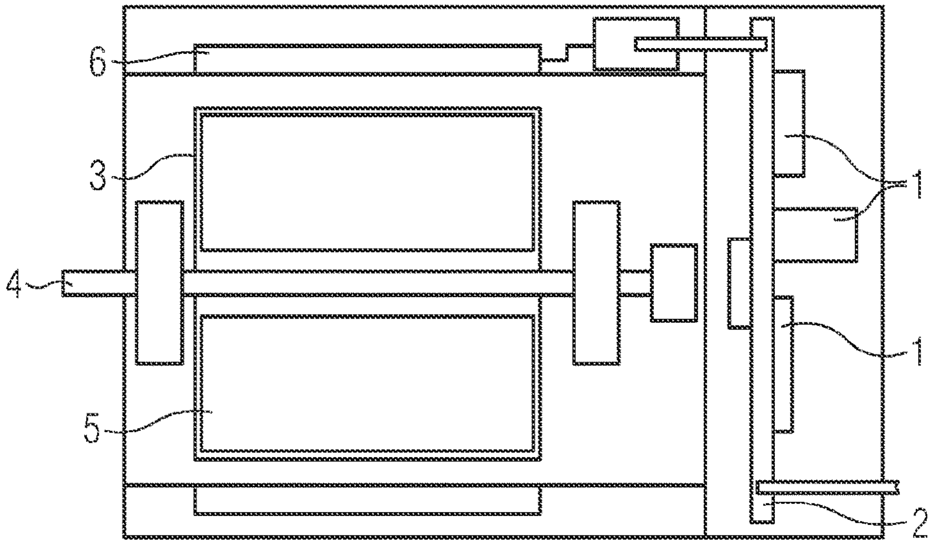
FIG. 1 is a schematic illustration of an exemplary control device for a motor vehicle.

The exemplary control device shown in FIG. 1 comprises an electronic circuit 1 on a circuit board 2, an electric motor 3 with a shaft 4, where the shaft is connected to an actuator (not shown) for converting the rotational movement into a linear movement.

The electric motor 3 is preferably formed as a brushless DC motor (BLDC motor) with three-phase winding and excitation by permanent magnets 5 that are particularly suitable as servomotors.

The permanent magnets 5 are often the most thermally sensitive elements of the arrangement, their maximum operating temperature, i.e., the Curie temperature, is between 100 and 460° Celsius for hard magnetic ferrites.

In order to prevent demagnetization, the temperature in the device must therefore be monitored and, if necessary, countermeasures taken in good time.

Figure 3:
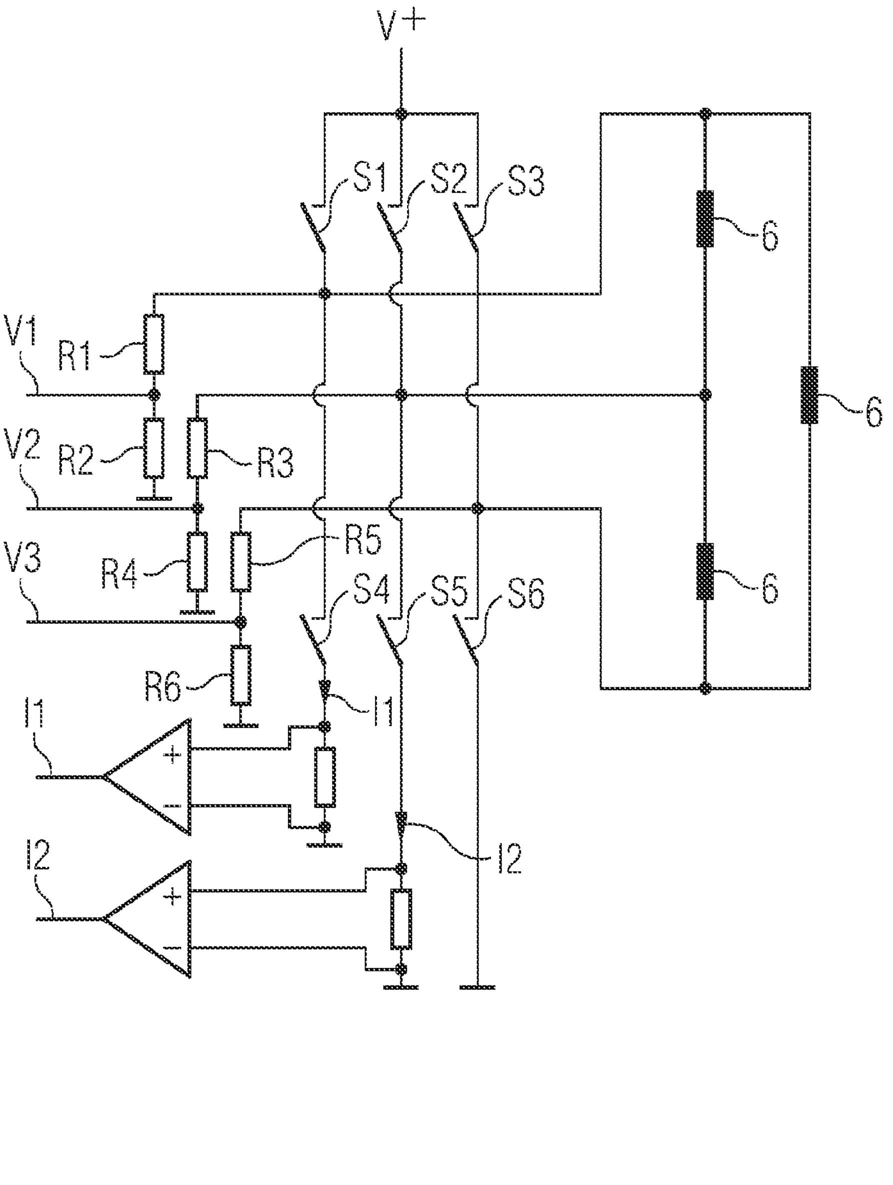
FIG. 3 is an exemplary illustration of a typical measurement setup for the case of a brushless DC motor with delta connection.

In accordance with the invention, the electrical resistance 7 of a winding 6 of the electric motor is therefore determined in the exemplary embodiment in a standstill phase of the electric motor. This results in a very simple measurement setup as shown in FIG. 3.

However, under certain circumstances it may also be advantageous to determine the resistance during the movement of the electric motor 3 in a quasi-stationary state and to determine the temperature therefrom.

This temperature also corresponds to a good/optimal approximation of the temperature of the environment in the motor and thus also of the permanent magnets.

For this purpose, a defined current pulse is applied by the electronic circuit 1 of the selected winding 6, i.e., an electrical impulse with a constant current amplitude and a duration that corresponds approximately to twice the impulse response determined by the inductance of the winding 6.

Thus, on the one hand, a stable output voltage is obtained at the end of the impulse and, on the other hand, the time is too short for the current in the winding to cause significant self-heating.

It can also be advantageous to provide as high a current amplitude as possible to keep inaccuracies of current amplifiers of the electronic control system low and thus increase the accuracy of the temperature determination.

By measuring the motor voltage, with knowledge of the current amplitude, the current resistance of the motor winding 6 can be determined in a conventional manner in accordance with the relationship R=U/I.

The voltage can either be measured directly on the motor or alternatively via the very accurate measurement of the input voltage on the control device divided by the current pulse width modulation of the output stage.

As shown in a diagrammatic view in FIG. 3, for this purpose, in the case of a brushless DC motor (BLDC motor) with delta connection of the windings 6, which is driven by switches SL . . . S6, the winding voltages V1, V2, V3 are measured via high-resistance voltage dividers R1/R2, R3/R4 and R5/R6, and the currents I1, I2 are measured by two windings 6 via current shunts, and the current through the third winding results from this in accordance with the Kirchhoff rule I3=I1+I2. From these values, the current resistance of the windings 6 and, in turn, the temperature can be determined.

With the specific temperature coefficient α of the winding material, in the exemplary embodiment copper (α=0.00393 per K), and the winding resistance of the motor (42.2 mΩ+/−7%) at 23.5° C., according to $$\Delta R = \alpha \times \Delta T \times R_k$$

-continued $$R_w = R_k + \Delta R$$

the current temperature can now be determined.

In order to further increase the accuracy of the temperature determination, the ambient temperature can be determined in an idle state of the electrical device, in which the internal temperature of the device corresponds to the ambient temperature, and a calibration process of temperature determination can be performed with this known temperature.

This can occur, for example, in a motor vehicle on a factory floor both during the assembly of the vehicle or after a prolonged standstill, for example, during a maintenance operation.

If the temperature on this factory floor is 23.5° C., for example, then the result of the temperature determination must also have this value.

It may also be advantageous to perform the calibration process during the assembly of the control device before installation in the vehicle.

If the vehicle has a way to measure the ambient temperature, then it may be expedient to use this information to calibrate the temperature determination in the electrical device and to regularly perform the calibration process automatically after a prolonged standstill, including outdoors.

With this calibration, all initial errors of temperature determination are eliminated and, if performed regularly, ageing-related changes are also detected.

Figure 2:
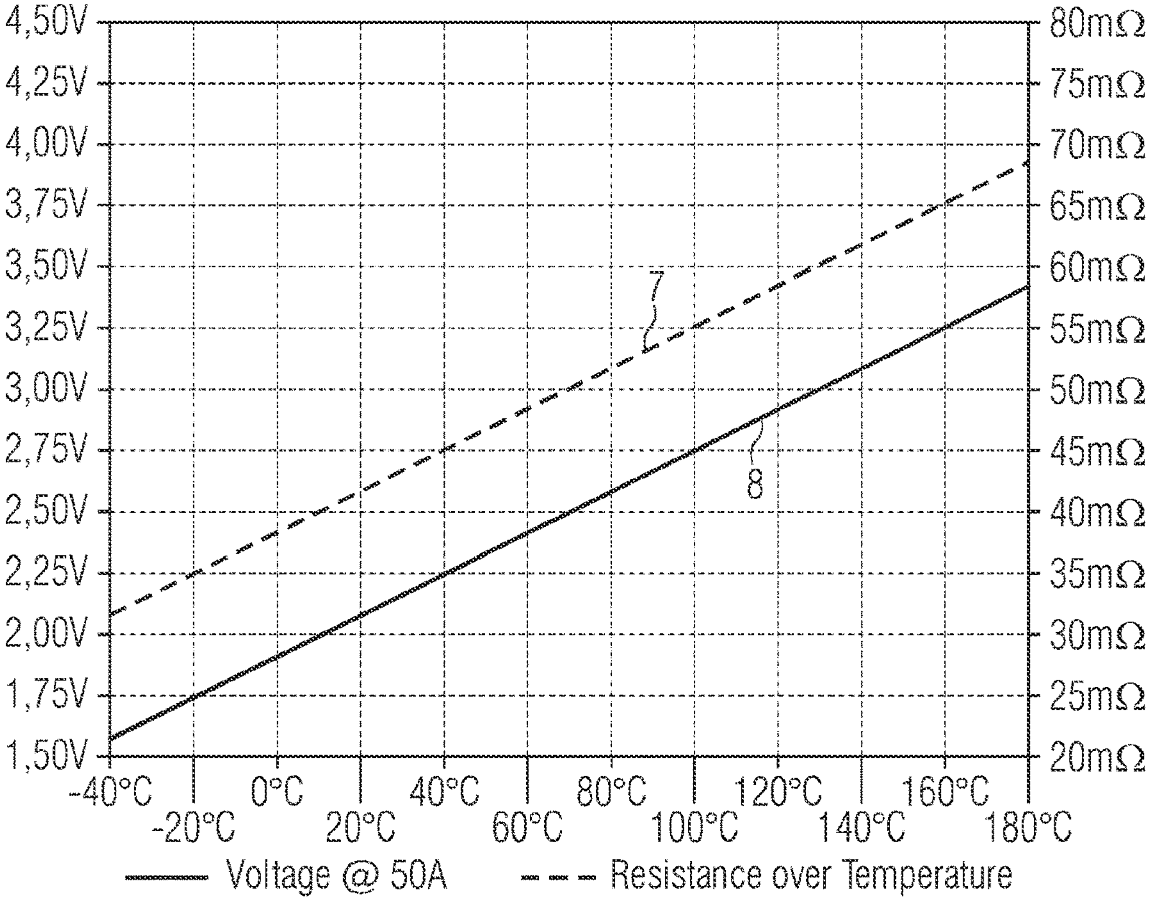
FIG. 2 is an exemplary graphical plot of a temperature-resistance characteristic.

To further illustrate the method in accordance with the disclosed embodiments of the invention, FIG. 2 shows, by way of example, the dependence of the winding resistance 7 and the motor voltage 8 on the temperature.

Figure 4:
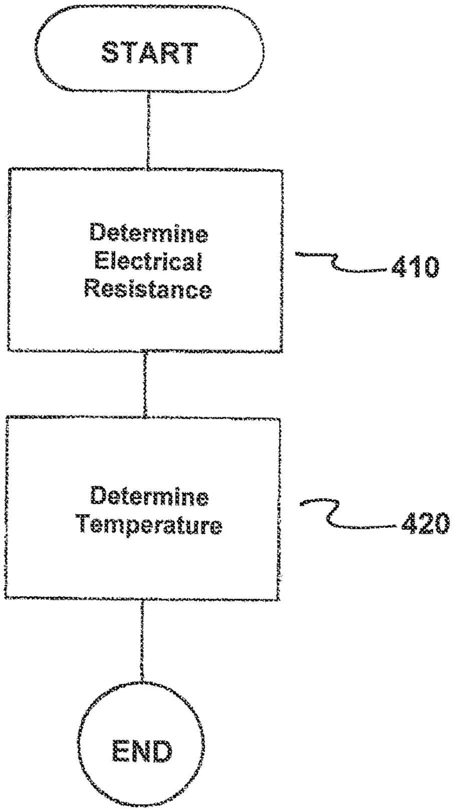
FIG. 4 is a flowchart of the method in accordance with the invention.

FIG. 4 is a flowchart of the method for determining temperature within an electronic control device of a motor vehicle, where the electronic control device comprising at least one electrical winding 6.

The method comprises determining an electrical resistance 7 of the at least one electrical winding 6 in a defined operating state, as indicated in step 410.

Next, the temperature is determined based on the electrical resistance 7 of the at least one electrical winding 6 in the defined operating state, as indicated in step 420.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE CHARACTERS

1 Electronic circuit
2 Circuit board

3 Electric motor

4 Shaft

Permanent magnet

6 Winding

7 Winding resistance

8 Motor voltage

S1 . . . S6 Switch

V1, V2, V3 Winding voltages

R1/R2, R3/R4, R5/R6 Voltage divider

The invention claimed is:

1. A method for determining temperature within an electronic control device of a motor vehicle, the electronic control device comprising at least one electrical winding, the method comprising:

determining an electrical resistance of the at least one electrical winding in a defined operating state; and determining the temperature based on the electrical resistance of the at least one electrical winding in the defined operating state.

2. The method as claimed in claim 1, wherein the electrical resistance of the at least one electrical winding is determined by applying an electrical impulse with a constant current amplitude and measuring a voltage on the at least one electrical winding.

3. The method as claimed in claim 1, wherein the electrical resistance of the at least one electrical winding is determined by applying an electrical impulse with a constant voltage amplitude and measuring current in the at least one electrical winding.

4. The method as claimed in claim 1, wherein a temperature coefficient of a specific resistance of material of the at least one electrical winding is utilized to determine the temperature of the at least one electrical winding.

5. The method as claimed in claim 1, wherein ambient temperature is determined and a calibration process of temperature determination is performed with this known temperature during an idle state of the electrical device in which an internal temperature of the electrical device corresponds to the ambient temperature.

6. The method as claimed in claim 1, wherein the at least one electrical winding of an electric motor is utilized for temperature determination.

* * * * *